United States Patent [19]

Nosaka et al.

[11] Patent Number: 4,813,919
[45] Date of Patent: Mar. 21, 1989

[54] TOOTHED BELT MANUFACTURE

[75] Inventors: Sokichi Nosaka, Kagawa; Takeshi Hamura, Aichi; Takaji Nagai, Kobe, all of Japan

[73] Assignee: Mitsuboshi Belting, Ltd., Kobe, Japan

[21] Appl. No.: 94,518

[22] Filed: Sep. 9, 1987

[30] Foreign Application Priority Data

Sep. 11, 1986 [JP] Japan ............... 61-215486

[51] Int. Cl.$^4$ .................................. F16G 1/04
[52] U.S. Cl. ........................... 474/266; 474/268
[58] Field of Search ............... 474/253, 254, 258, 266, 474/267, 269

[56] References Cited

U.S. PATENT DOCUMENTS 3,250,653  5/1966  Geist et al. ............... 156/138
4,695,269  9/1987  Tassone et al. ............ 474/268

FOREIGN PATENT DOCUMENTS 718148  12/1968  Belgium .
763874   8/1971  Belgium .
239334   9/1987  European Pat. Off. .
1164652  3/1964  Fed. Rep. of Germany .
3202473 11/1983  Fed. Rep. of Germany .
3406123  8/1985  Fed. Rep. of Germany .
123750  10/1978  Japan .

Primary Examiner—Thuy M. Bui
Attorney, Agent, or Firm—Wood, Dalton, Phillips, Mason & Rowe

[57] ABSTRACT

A toothed belt and method of manufacturing the same wherein the opposed ends of a tooth covering fabric are stitched with an interposed rigid element disposed within the stitching. The rigid element is used to accurately locate the joint of the fabric with respect to the tooth molding groove, at least during a subsequent tensile cord winding step which normally tends to displace the fabic joint. The joint may be accurately located as desired with respect to the mandrel or mold. Different structure for holding the ends of the rigid element are disclosed. The rigid element may be removed prior to the rubber vulcanization step during which step the wrapped tensile cord effectively maintains the fabric joint at the desired location.

9 Claims, 2 Drawing Sheets

TOOTHED BELT MANUFACTURE

TECHNICAL FIELD

This invention relates to toothed belts and in particular to toothed belts having a cover fabric on the toothed portion thereof.

BACKGROUND ART

One conventional form of toothed belt for use with toothed pulleys comprises a rubber belt having an inner toothed portion provided with a cover fabic.

In manufacturing such belts, the cover fabric is placed about a grooved mandrel. A suitable tensile cord is then wrapped about the cover fabric and an outer layer of unvulcanized rubber is wrapped about the tensile cord.

The assembly is then placed in a suitable enclosure and steam introduced thereinto so as to cause fluidization of the unvulcanized rubber. The pressure of the steam urges the rubber inwardly between the turns of the spirally wrapped tensile cord and against the fabric, urging the fabric against the outer surface of the mandrel so as to define an inner cover of the resultant vulcanized toothed belt.

A problem arises in the conventional manufacture of such toothed belts in this manner in that the location of the joint at the end of the fabric may be located at the root of the tooth where substantial wear occurs in the normal use of the belt. Separating of the fabric at that point causes rapid degradation of the belt, such as moisture, oil, etc., and exposes the tensile cords so as to cause early failure thereof.

To avoid such tooth root cracking, the protective fabric cover is arranged on the mandrel so as to attempt to dispose the fabric joint away from the toothed root area. However, it has been found difficult to maintain the location of the fabric joint as the winding of the tensile cord thereabout under substantial tension tends to displace the fabric joint during that operation.

DISCLOSURE OF INVENTION

The present invention comprehends an improved toothed belt manufacture wherein the fabric joint is accurately maintained in spaced relationship to the tooth root so as to avoid the fabric breaking problem in a novel and simple manner.

More specifically, the invention comprehends the provision of means associated with the fabric joint for locking the fabric joint at a preselected position in the mandrel groove during the winding of the tensile cord thereabout so as to effectively preclude displacement of the joint during such operation.

The invention comprehends locating the joint accurately at any desired position, including locating the joint at the center of the bottom of the groove, or at one of the side faces thereof.

In the illustrated embodiment, the means for maintaining the fabric joint accurately positioned comprises one or more rigid elements extending along the joint and retained in association therewith by stitching extending across the joint and around the elements.

The rigid element is disposed within the mandrel groove so as to locate the fabric joint at the desired position. The rigid element maintains the fabric joint at that position during the winding of the tensile cords about the fabric.

The invention comprehends such a manufacture wherein the rigid element is removed from the fabric prior to the fluidization of the rubber and forming of the vulcanized toothed belt by the subsequent application of pressure and heat thereto.

The flow of the rubber during the vulcanization process urges the fabric against the surface of the mold, as discussed above. The outer portion of the stitching is thusly also urged against the mold surface and, thus, lies flat on the fabric cover in the finished belt. The portion of the stitching through which the rigid element was disposed has been found to extend into the tooth rubber in a somewhat looped arrangement, whereby the rubber tends to lock the stitching across the fabric ends defining the joint for further improved wear prevention.

In the illustrated embodiment, the opposite ends of the rigid element are held accurately to maintain the fabric joint at the desired location in the mandrel groove. In the illustrated embodiment, a pair of such rigid elements is utilized.

It is preferable that the outer surface of the elements have a low friction so as to facilitate withdrawal thereof from the stitching.

In the illustrated embodiment, the rigid elements comprise wires.

More specifically, the invention comprehends the provision of a method of forming a toothed belt on a mandrel defining an axis and a peripheral surface having a plurality of circumferentially spaced tooth-forming grooves extending parallel to the axis, the method including the steps of forming a sleeve from a preselected length of tooth-covering fabric by juxtaposing the opposite ends of the length, disposing an elongated element along the juxtaposed ends, and stitching the fabric opposite ends together with stitching extending about the element to define a stitched joint, disposing the sleeve in coaxial surrounding relationship with the mandrel and with the stitched joint disposed at a preselected position in one of the mandrel grooves, wrapping a tensile cord under preselected tension about the sleeve while maintaining the stitched joint at the preselected position, withdrawing the element longitudinally from the stitched joint, and forming a rubber belt body in association with the tensile cord and fabric by forcing flowable rubber inwardly from about the tensile cords into the grooves to urge the fabric against the peripheral surface of the mandrel, with the stitched joint maintained accurately at the preselected position by the urged tensile cord, and causing the rubber to set to define a fabric covered toothed rubber belt.

The invention further comprehends the alternative formation of the stitching loops prior to the insertion of the rigid element therethrough.

The stitching yarn may comprise a somewhat elastic yarn.

Where the toothed belt is relatively long, the belt may be formed with a plurality of such stitched and accurately located joints.

The invention comprehends a toothed belt manufactured as discussed above so as to comprise a rubber belt body defining a toothed portion, and a cover fabric on the toothed portion, the cover fabric defining juxtaposed end portions joined by interconnecting stitching having an outer portion facially juxtaposed to an outer surface portion of the fabric end portion and an inner portion extending inwardly from the fabric end portions into the toothed portion of the belt body.

The toothed belt manufacture of the present invention is extremely simple and economical, while yet providing a wear resistant, fabric covered toothed belt having extended useful life.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 2:
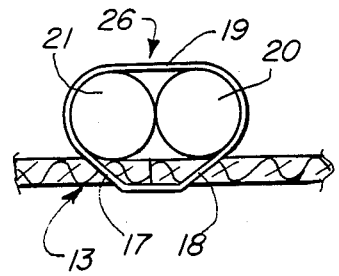
FIG. 2 is a fragmentary enlarged elevation illustrating the stitching of the juxtaposed fabric end portion in association with a pair of rigid elements to define a rigidified joint for use in carrying out the invention.

In the illustrative embodiment of the invention as disclosed in the drawing, a toothed belt generally designated 10 comprises a rubber body 11 having a plurality of longitudinally spaced, transversely extending teeth 12. The teeth are covered with a cover fabric 13 having a stitched joint 14 accurately located with respect to the teeth. The rubber body further includes an outer portion 15 in which is embedded a conventional tensile cord 16.

The invention comprehends an improved manufacture of such a toothed belt wherein the stitched joint 14 is accurately maintained in a preselected position during the manufacture of the belt.

Figure 1:
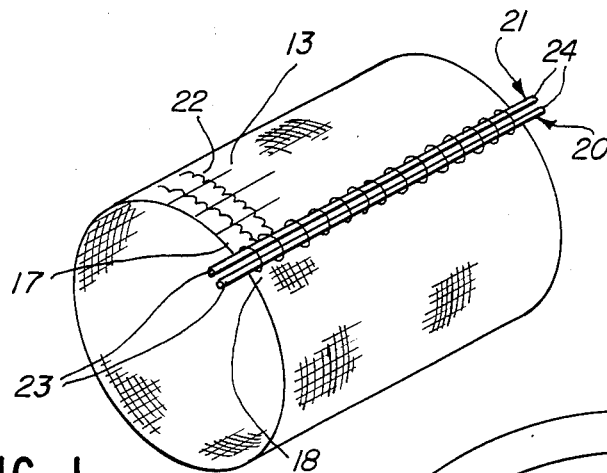
FIG. 1 is a schematic perspective view illustrating the formation of a fabric sleeve embodying the invention.

As shown in FIG. 1, the cover fabric 13 comprises a cut length of the fabric having juxtaposed ends 17 and 18 stitched together by stitching 19 extending about a pair of rigid elements 20 and 21. In the illustrated embodiment, the fabric 13 includes crimped warp yarns 22 extending circumferentially of the fabric sleeve.

In the illustrated embodiment, the fabric 13 comprises a rubber-coated, elastic fabric wherein the warp yarns are formed of woolly processed nylon and the weft yarns are formed of conventional nylon, such as nylon 6.

As shown in FIG. 2, the stitching 19 extends about the pair of rigid elements 20 and 21 and through the fabric ends 17 and 18 in a looped arrangement. The stitching yarn is preferably a yarn having a slight elasticity so as to be somewhat stretched around the elements 20 and 21.

In the illustrated embodiment, two rigid elements are utilized, it being understood that a single such element or a greater plurality of elements may be utilized within the broad scope of the invention.

The rigid elements preferably have a length greater than the width of the fabric so as to define projecting ends 23 and 24. The rigid elements may comprise wires, such as piano wires, synthetic resin rods, etc. The surface of the rigid elements preferably has a relatively low friction. In the illustrated embodiment, the wires have a diameter in the range of approximately 1 to 2 mm.

The stitching yarn may be formed of twisted yarns or monofilaments of synthetic resin, such as nylon, polyester, polypropylene, aromatic polyamide, etc. The suturing or stitching of the joint may be effected by automated apparatus, such as a sewing machine.

The invention alternatively comprehends providing the looped stitching 19 prior to the insertion of the rigid rods through the looped portion thereof, within the broad scope of the invention.

One excellent example of such rods comprises stainless steel wires which may be coated with lubricant or treated with a low friction resin, such as Teflon ®.

Figure 3:
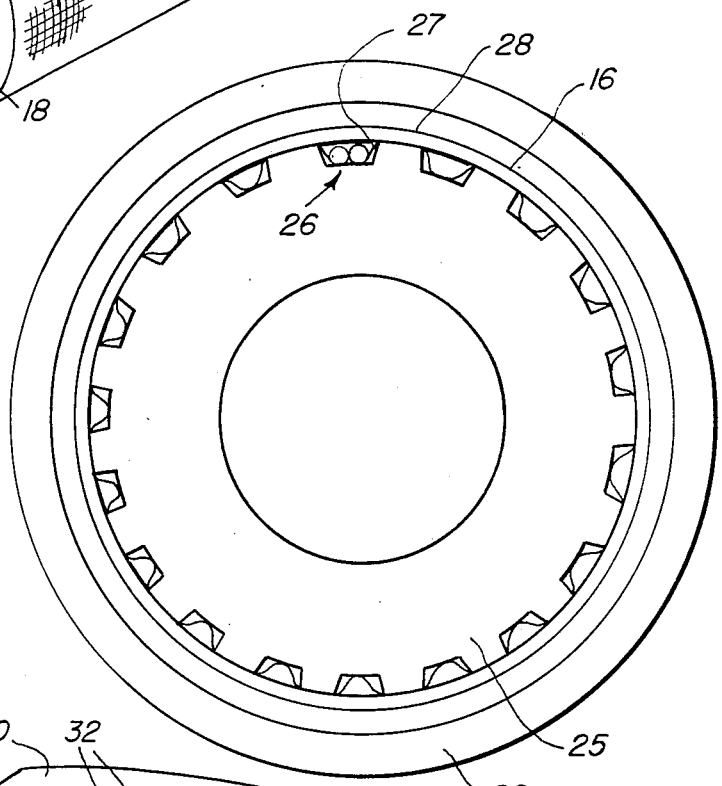
FIG. 3 is a transverse section illustrating the arrangement of the fabric sleeve on a grooved mandrel, with a tensile cord spirally wrapped thereabout and unvulcanized rubber sheet wrapped about the tensile cord, the assembly being disposed within a suitable container for effecting subsequent vulcanization and formation of the toothed belt.
Figure 4:
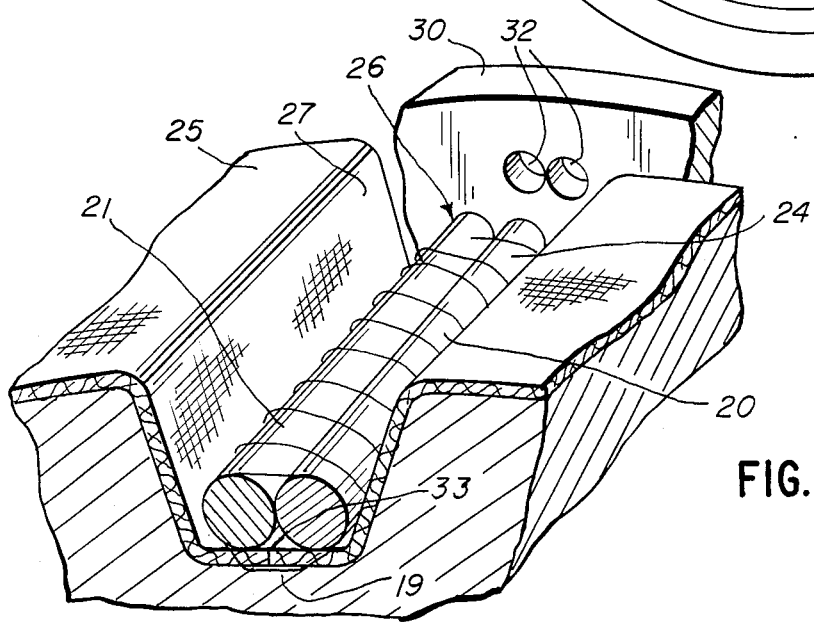
FIG. 4 is a fragmentary enlarged perspective section illustrating the arrangement of the stitched joint at the center of the mandrel groove bottom face.

As illustrated in FIG. 3, the fabric sleeve is mounted about a peripherally grooved mandrel 25, with the rodded joint generally designated 26 centered in one of the grooves 27 thereof. The tensile cord 16 is spirally wrapped under a preselected tension about the fabric sleeve on the mandrel. As shown in FIG. 3, portions of the fabric sleeve extend downwardly into the grooves of the mandrel and the tensile cord bears against the intermediate portions of the fabric sleeve on the outer peripheral surface of the mandrel. Because of the rigidifying action of the rods 20 and 21, the joint 26 resists any tendency for the joint to be displaced as a result of the forces generated in the winding of the tensile cord thereabout. Thus, the fabric joint is accurately maintained at the center of the groove, in the arrangement of FIG. 3.

Upon completion of the winding of the tensile cord about the fabric, a preselected thickness of rubber sheeting 28 is wrapped about the tensile cord. The rubber sheeting is formed of unvulcanized rubber which may comprise any one or combination of natural rubber, styrene-butadiene rubber, chloroprene rubber, nitrile rubber, or butyl rubber.

The thusly wrapped mandrel is installed in a suitable vulcanizing shell 29. A conventional degassed cloth sheet and outer rubber jacket may be provided within the shell (not shown), in the conventional manner. High pressure steam is introduced through the shell into surrounding relationship to the rubber sheet, and the rubber is effectively fluidized thereby and caused to flow between the turns of the tensile cord into the grooved portion of the mandrel, urging the fabric 13 firmly against the peripheral surface of the mandrel so as to define the outer cover of the toothed portion of the final vulcanized belt. Conventionally, the steam is introduced at a pressure of 7 to 8 kg/cm$^2$, at a temperature of approximately 150° to 160° C.

Figure 5:
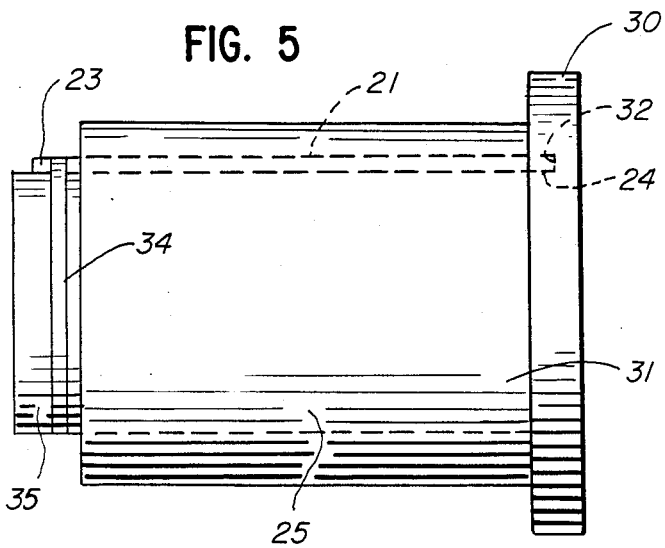
FIG. 5 is a side elevation illustrating means for holding the rigid elements in accurate relationship to the mandrel groove during the tensile cord winding operation.

One method of holding the rods 20 and 21 accurately at the desired position in the groove 27 during the tensile cord wrapping step is illustrated in FIG. 5. Thus, as shown therein, a locating plate 30 is provided at one end 31 of the mandrel 25. The locating plate is provided with suitable axially opening axially opening recesses 32 for receiving the ends 24 of the rods to maintain the stitched joint accurately at the center 33 of the groove. The opposite ends 23 of the rods may be retained in the accurately centered arrangement, as by providing a bonding tape 34 about the rods on an extension 35 of the mandrel, as shown in FIG. 5. Illustratively, the bonding tape may comprise conventional adhesive tape.

Figure 7:
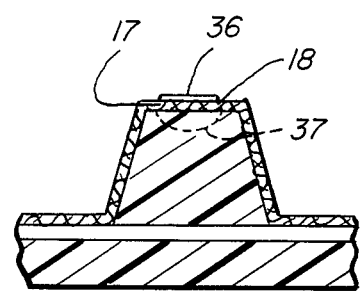
FIG. 7 is a fragmentary longitudinal section thereof illustrating the arrangement of the stitching therein.
Figure 6:
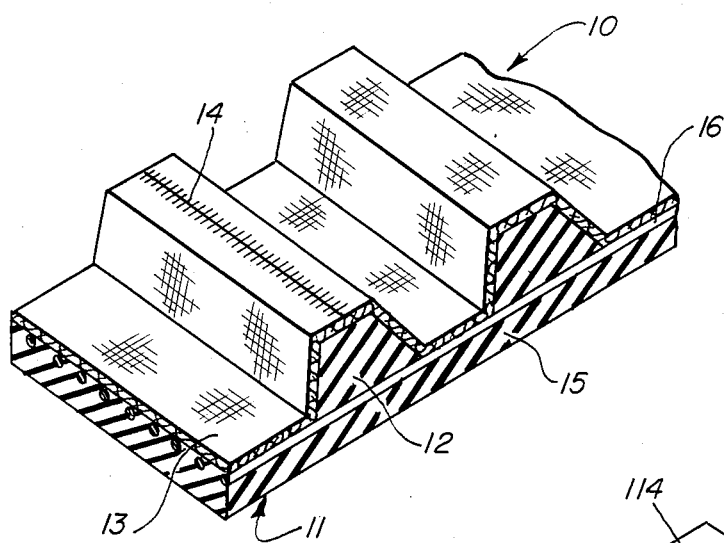
FIG. 6 is a fragmentary perspective view of a toothed belt embodying the invention.

As indicated above, upon completion of the wrapping of the tensile cord about the fabric on the mandrel, the rods are removed from the stitching as the tensile cords then act to retain the fabric accurately during the subsequent belt forming operations. Upon removal of the rods, the stitching 19 defined an outer portion 36 which tends to lay flat against the outer surface of the fabric ends 17 and 18, and an inner portion 37 which remains somewhat looped, projecting away from the fabric, as illustrated in FIG. 7.

The fluidized rubber which flows inwardly toward the bottom of the groove 27 during the vulcanization step flows around the looped stitching portion 37 so as to effectively cause an embedment of the looped portion in the rubber, thereby providing improved retention of the stitching in the final belt construction.

While the invention has been disclosed in connection with the toothed fabric being provided on the inner teeth of the belt, in certain belt manufactures, outer teeth are formed also on the belt and provided with an outer fabric cover. Thus, the invention comprehends the accurate location of the stitched ends of the outer fabric in the same manner with respect to the groove of the outer mold element in which it is desired to center the joint.

Figure 8:
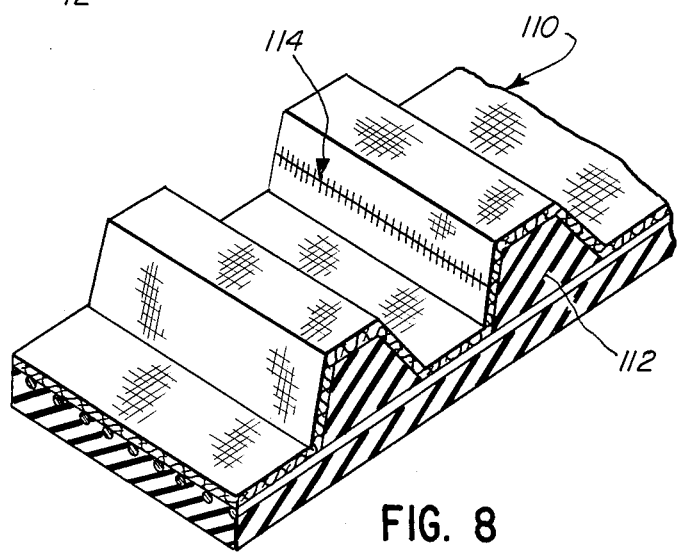
FIG. 8 is a fragmentary perspective view illustrating a modified belt manufacture embodying the invention wherein the fabric joint is accurately located at a side face of the belt tooth.

The invention further comprehends the location of the fabric joint at any desired position within the tooth-forming groove, and in FIG. 8, a belt generally designated 110 is shown to comprise a belt manufactured in conformity with the invention wherein the stitched joint 114 is disposed at the center of the sidewall surface of the belt tooth 112. The manufacture of the belt 110 is substantially identical to the manufacture of belt 10 except for the location of the rodded joint along the side surface of the mandrel groove rather than at the bottom surface of the mandrel groove.

The vulcanized belt structure thusly manufactured preferably has a width greater than the desired final belt elements. Thus, the belt structure may be longitudinally divided by suitable cutting means (not shown) to define the desired narrow width toothed belts.

As discussed above, where the belt has a substantial length a number of such joints may be similarly provided.

The elasticity of the stitching yarn tends to cause the outer stitching portion 36 to be maintained under a slight tension, thereby maintaining the outer stitching substantially taut against the outer surface of the fabric, thereby providing further improved long, troublefree life of the resultant belt.

As will be obvious to those skilled in the art, the belt manufacture may be effected by means of elongated elements, or rods, formed of a material suitable to be retained in the final belt construction, within the broad scope of the invention. Thus, illustratively, the rigid elements may be formed of semivulcanized rubber, thermoplastic synthetic resin, etc. The use of such retained elements in supporting the inner portion of the stitching tend to further maintain the looped configuration of the stitching portion 37 and maintained tautness of the outer portion 36.

The foregoing disclosure of specific embodiments is illustrative of the broad inventive concepts comprehended by the invention.

We claim:

1. A toothed belt comprising:
   a rubber belt body defining a toothed portion; and
   a cover fabric on said toothed portion, said cover fabric defining juxtaposed end portions joined by interconnecting stitching having an outer portion facially juxtaposed to an outer surface portion of said fabric end portion and an inner portion extending substantially inwardly from said fabric end portions to be embedded in said toothed portion of the belt body.

2. The toothed belt of claim 1 wherein said toothed portion of the belt defines an outer tip, and said joined end portions of the fabric are disposed accurately at said outer tip.

3. The toothed belt of claim 1 wherein said toothed portion of the belt defines side faces and said joined end portions of the fabric are disposed accurately at a preselected portion of one of said side faces.

4. The toothed belt of claim 1 wherein said toothed portion of the belt defines an outer tip, and said joined end portions of the fabric are disposed accurately at the center of said outer tip.

5. The toothed belt of claim 1 wherein said toothed portion of the belt defines side faces and said joined end portions of the fabric are disposed accurately at the center of one of said side faces.

6. The toothed belt of claim 1 wherein said inner portion of the stitching defines a loop extending arcuately in said toothed portion of the rubber belt body.

7. The toothed belt of claim 1 wherein said fabric comprises a fabric which is elastic in the circumferential direction of said sleeve.

8. The toothed belt of claim 1 wherein said sleeve includes only a single such stitched pair of end portions.

9. The toothed belt of claim 1 wherein said stitching is formed of yarn having a preselected small elasticity.

* * * * *